March 7, 1933.  W. HINCKELMANN  1,900,500
ADJUSTABLE ARC
Filed April 14, 1931
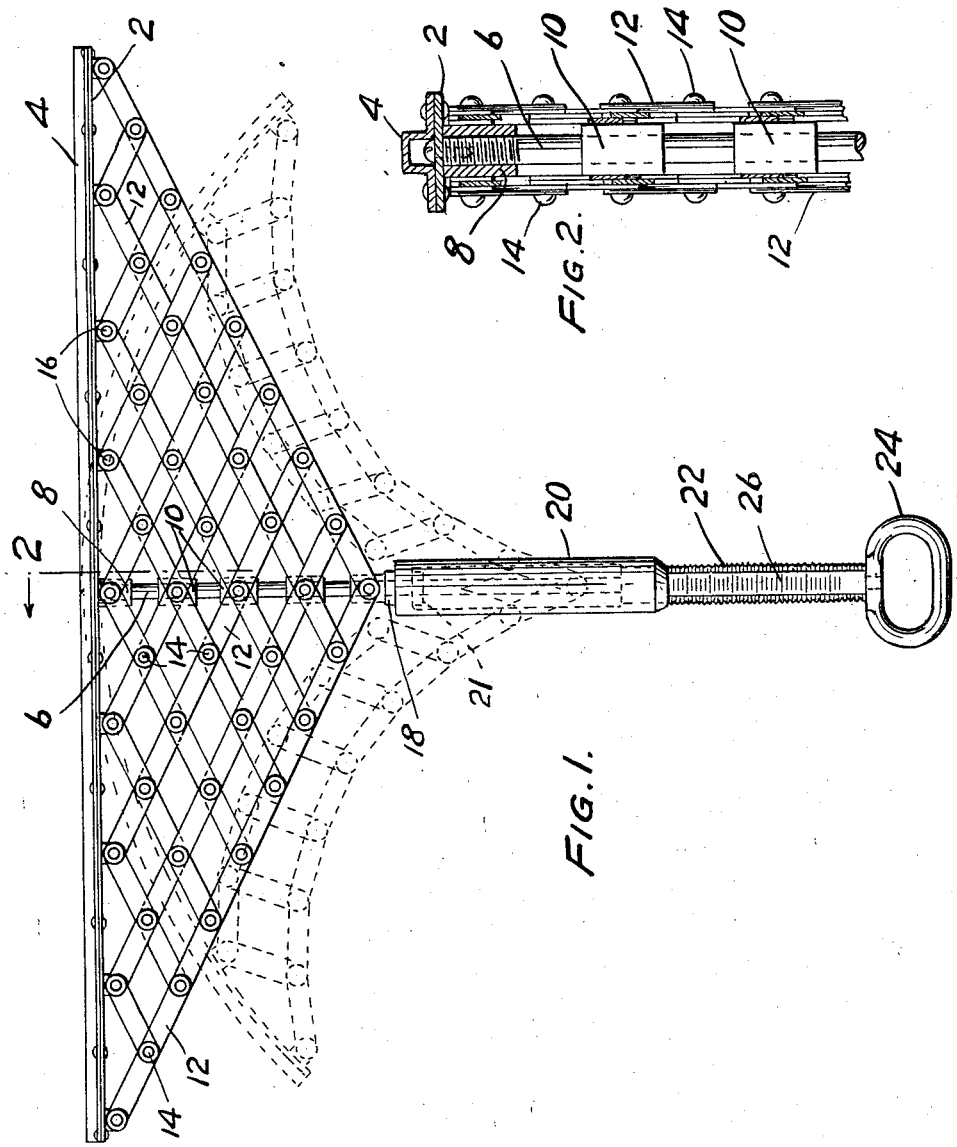
INVENTOR
Werner Hinckelmann
BY
Busser & Harding
ATTORNEYS.
WITNESS:

Patented Mar. 7, 1933

1,900,500

UNITED STATES PATENT OFFICE

WERNER HINCKELMANN, OF PHILADELPHIA, PENNSYLVANIA

ADJUSTABLE ARC

Application filed April 14, 1931. Serial No. 529,925.

This invention relates to an adjustable arc for the use of draftsmen in drawing arcs of large radii, particularly arcs which are considerably beyond the range of practical compasses.

It is a primary object of the invention to provide a flexible ruling edge arranged so as to be adjustably flexed to form different arcs, which arcs are substantially circular in form. To this end a linkage is provided connected to the ruling edge at various points so that the form of the ruling edge in various positions of adjustment is closely maintained.

It is a further object of the invention to provide a device of this character which may be graduated directly in terms of the radii of the arcs to which it is adjusted.

These and other objects of the invention relating particularly to details of construction will be apparent from the following description read in conjunction with the accompanying drawing in which:

Fig. 1 is a plan view of the device shown in full lines in position with the ruling edge straight and partially in dotted lines to illustrate the flexure of the linkage to produce an arcuate form of ruling edge; and Fig. 2 is a fragmentary section taken as indicated by the line 2 in Fig. 1.

The adjustable arc comprises a flexible backing member 2 to the face of which is secured a suitable member 4 of celluloid or the like to provide the ruling edge. Pivoted to the member 2 and extending perpendicularly therefrom at about its center is a guiding rod 6 threaded at its inner end for engagement with a nut 8. Slidable on the rod 6 are a number of slides 10, the outermost slide being specifically designated as 18.

Pivoted to these slides 10 and 18 and also to nut 8 are certain links of a composite linkage illustrated at 12 and composed of a large number of small links arranged to form a plurality of rhombic aggregations, certain of the boundary links being pivoted to the member 2 as indicated at 16. Preferably upper and lower sets of these links are provided as clearly indicated in Fig. 2 there being corresponding upper and lower links, the two sets being provided primarily to obtain the necessary rigidity. It will be obvious, of course, that but one set need be used. The links are pivoted to each other by pins 14 which may connect the corresponding pivot points of the upper and lower sets.

The slide 18 is provided with a swivel connection, as at 21, with a nut 20 which is threaded on the enlarged outer end 22 of the member 6. This outer end terminates in a suitable handle 24. Preferably the enlarged end is cut flat on one side and provided with a scale 26 which may be graduated in any suitable units, preferably in the radii of the arcs producible by flexure of the ruling edge.

From the above it will be clear that when the nut 20 is rotated on the screw 22 it will move lengthwise of the guiding member 6 thereby producing a deformation of the linkage to the extreme illustrated in dotted lines in Fig. 1, to which deformation will correspond a certain radius of curvature of the ruling edge.

A zero adjustment is provided by reason of the nut 8 threaded on the inner end of the guiding member 6. While in the ordinary operation of the device the member is not turned relatively to the member 2, it may be turned relatively thereto to provide zero adjustment. When so turned the member 8 moves inwardly or outwardly producing suitably slight flexure of the linkage. In this way the device may be set so a reading of the scale indicating infinite radius will correspond to a straight ruling edge.

Preferably the zero adjustment referred to takes place during the assembly of the instrument to secure absolute correlation between the positions of the ruling edge and the scale which is laid out mathematically to bear proper proportionality to the curve. After assembly of the instrument, the nut 8 may be fastened to the rod by drilling a hole through both and riveting them together.

It will be clear that numerous variations in the invention may be made without departing from the spirit thereof as defined in the following claims.

What I claim and desire to protect by Letters Patent is:

1. An adjustable arc comprising a flexible ruling edge, a guiding member connected thereto, a member movable along the guiding member, and a linkage connecting the ruling edge and movable member, whereby movement of the movable member effects flexure of the ruling edge, said linkage including links forming a reticulated array of quadrilaterals joined to the ruling edge at a plurality of points.

2. An adjustable arc comprising a flexible ruling edge, a guiding member connected thereto, a member movable along the guiding member, a nut threaded on the guiding member and connected to the movable member, and a linkage connecting the ruling edge and movable member, whereby movement of the movable member effects flexure of the ruling edge, said linkage including links forming a reticulated array of quadrilaterals joined to the ruling edge at a plurality of points.

3. An adjustable arc comprising a flexible ruling edge, a guiding member connected thereto, a member movable along the guiding member, a nut threaded on the guiding member and connected to the movable member, and a linkage connecting the ruling edge and movable member, whereby movement of the movable member effects flexure of the ruling edge, said guiding member being provided with a scale for cooperation with the movable member indicative of the curvature of the ruling edge in various positions of adjustment, said linkage including links forming a reticulated array of quadrilaterals joined to the ruling edge at a plurality of points.

4. An adjustable arc comprising a flexible ruling edge, a guiding member connected thereto, a member movable along the guiding member, a nut threaded on the guiding member and connected to the movable member, and a linkage connecting the ruling edge and movable member, whereby movement of the movable member effects flexure of the ruling edge, said guiding member being provided with a scale for cooperation with the movable member indicative of the curvature of the ruling edge in various positions of adjustment, and said guiding member being adjustable relative to the ruling edge for zero adjustment, said linkage including links forming a reticulated array of quadrilaterals joined to the ruling edge at a plurality of points.

5. An adjustable arc comprising a flexible ruling edge, a guiding member connected to the mid-portion of the ruling edge and extending perpendicularly thereto, slides on the guiding member, and a linkage comprising an array of links pivoted to the ruling edge, the slides, and each other forming a plurality of rhombic aggregations, whereby movements of the slides on the guiding member effect flexure of the ruling edge.

In testimony of which invention, I have hereunto set my hand, at Philadelphia, on this 10th day of April, 1931.

WERNER HINCKELMANN.